B. KUHNS.
Grain Drill.
No. 96,926. Patented Nov. 16, 1869.
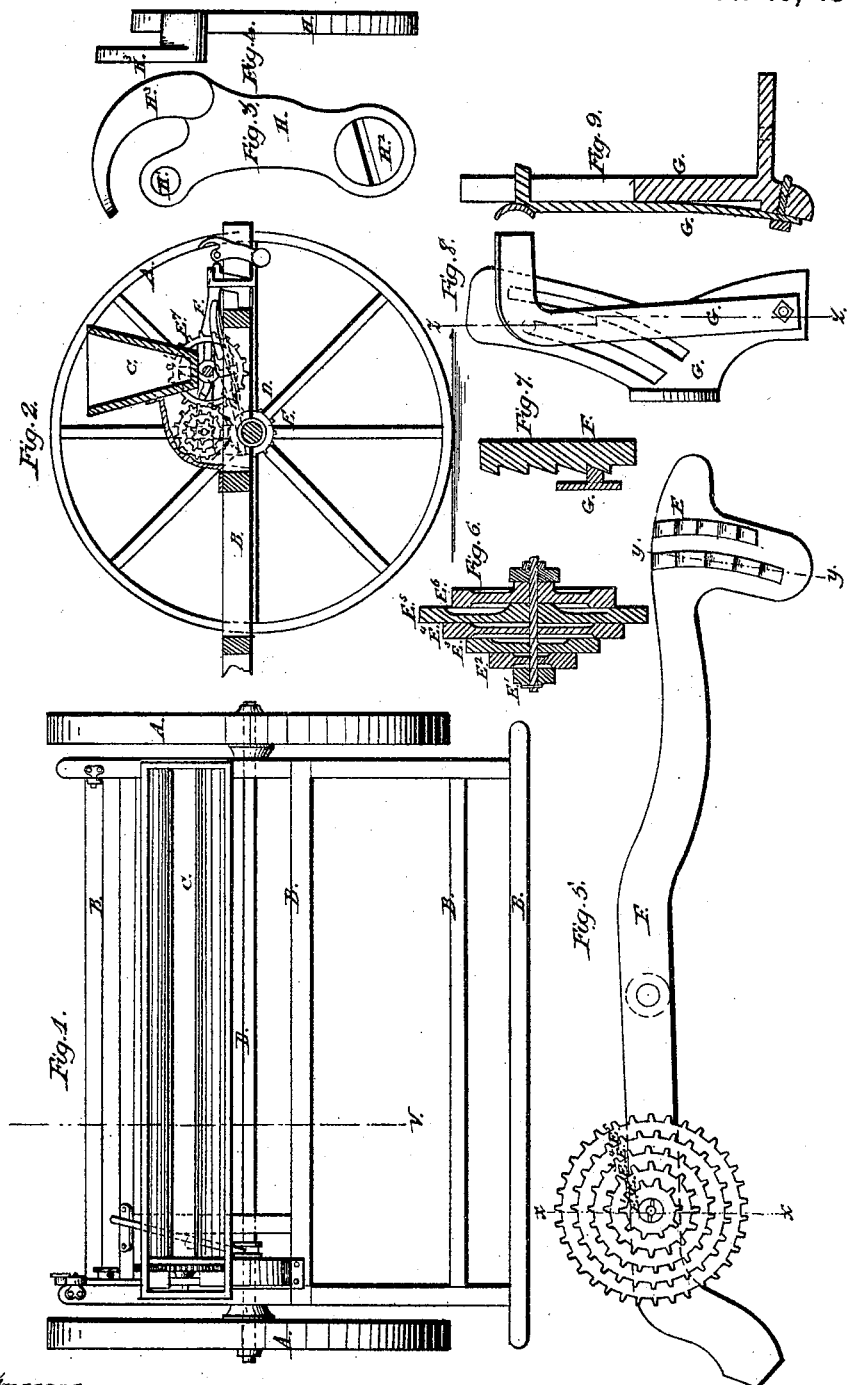

UNITED STATES PATENT OFFICE.

BENJAMIN KUHNS, OF DAYTON, OHIO.

IMPROVEMENT IN GRAIN-DRILLS.

Specification forming part of Letters Patent No. 96,926, dated November 16, 1869.

*To all whom it may concern:*

Be it known that I, BENJAMIN KUHNS, of Dayton, in the county of Montgomery, and in the State of Ohio, have invented a new and useful Improvement in Grain Drills; and I do hereby declare that the following is a full, clear, and exact description thereof, reference being had to the accompanying drawings, making a part of this specification, in which—

Figure 1 is a plan view of so much of a grain-drill as is necessary to illustrate my improvements. Fig. 2 is a sectional elevation on line $v\ v$ of Fig. 1. Fig. 3 is a side view of the lever or arm for throwing the machine out of gear, and Fig. 4 a side view of the same. Fig. 5 is an elevation of the lever to which the series of feed-gears are attached, showing also the gear upon its end, and the ratchet upon its opposite end for determining the position of such gears. Fig. 6 is a sectional elevation on line $x\ x$ of Fig. 5. Fig. 7 is a vertical elevation on line $y\ y$ of Fig. 5. Fig. 8 is a front view of the spring and guide for fixing the outer end of the lever which carries the series of feed-gears; and Fig. 9 is a section on line $z\ z$ of Fig. 8.

Corresponding letters refer to corresponding parts in the several figures.

This invention relates to grain-drills; and it consists in the construction, combination, and arrangement of the parts constituting my present invention, as will be more fully described hereinafter.

A A in the drawings represent the wheels of a grain-drill, which may be of any suitable construction, such as are ordinarily used for such purposes.

B B represent the frame-work of the machine, which may also be of the usual or of any desired form of construction; and D represents the axle of the machine.

The above parts do not form any part of my present invention, and consequently need not be more particularly described here.

E represents a gear-wheel, which is to be secured to the axle D, so as to turn therewith, but so as to be capable of sliding longitudinally thereon. It is to have a hub or projection upon its inner side, into which there is to be turned a groove to receive the end of a lever for the purpose of sliding such wheel upon the shaft D. This wheel meshes into and drives any one of the wheels lettered $E'$, $E^2$, $E^3$, $E^4$, and $E^5$, which are so arranged that either one of them may be used in connection with the wheel E by sliding the last-named wheel opposite the one with which it is desired to have it mesh for the time being, and thus forcing such wheel into gear with it by moving the outer end of lever F, to which the wheels are pivoted.

The series of wheels above alluded to are all placed upon a stud upon which they all rotate, they being secured together in such a manner that no one of them can turn independently of the other, but so that all move together. It will be observed that these wheels are of different diameter, the object of which is to enable the operator to change the movements of the axle in the hopper, so that a greater or less quantity of grain may be allowed to pass through such axle in passing a given distance, or, in other words, in order that a greater or less amount of seed may be sowed to the acre of ground. This result may be accomplished at any time by bringing a larger or smaller wheel to mesh with the wheel E upon the driving-shaft, as it will be seen that it has in it a given number of cogs, and that the wheel $E^7$, which is secured to the seed-distributing axle covering the grain-discharge apertures in the hopper, also has a given number of teeth, and hence, if the intermediate wheel has a greater or less number of cogs, a greater or less number of revolutions of the seed-axle will be caused at each revolution of the main shaft.

F represents a lever, which may be pivoted upon the seed-shaft under or in the grain-hopper; or it may be pivoted to the frame of the machine. To the forward end of this lever the series of wheels are secured, as above described, while upon its opposite or rear end there are to be formed ratchet-teeth, as shown at $F'$. In order that as this end of the lever is moved to bring into gear with wheel E any of the series upon this lever, its position may be fixed by the ratchet-teeth coming in contact with a stop upon spring $G'$, soon to be described.

G represents a guide, which is to be secured to the frame of the machine in such a position that the ratchet formation on the end of lever F shall work in the curved grooves or slots formed thereon. This guide has secured to its lower end a spring, $G'$, which passes up by the side thereof, and has near its upper end a projecting pin, which enters one of the curved grooves and acts as a stop for the outer end of lever F when in any of the proper positions, as shown in Fig. 7.

H represents an arm, which has in its outer end a socket with a bar extending across it, as shown at H', for the purpose of securing it to a wooden rod or bar which extends across the machine, and has upon its opposite end an arm, which is also pivoted to the frame of the machine, so that it may swing freely upon such arm and the one lettered H, which is pivoted to the frame at H'. Upon one side of the last-mentioned arm there is a curved projection, $H^3$, constructed as shown in Fig. 3, its office being to pass between the guide G and spring G' when the arm is swung upon its pivoted points, and thus release the stop upon such spring from its hold upon the lever F, and permit it to be changed so as to bring another of the series of gear-wheels into gear with wheel F, such wheel having first been slid upon the axle until its position thereon brings it in line with the wheel of the series with which it is intended to have it mesh.

By referring to Fig. 4 it will be seen that by the side of the curved projection on arm H there is a shoulder, the office of which is to bear upon the outer end of lever F, after the curved arm has released it from the control of the stop upon spring G', and throw down its outer end, thus lifting the series of wheels, or any of them, out of gear with the wheel E, so that no movement will be given to the grain-distributing axle in transporting the machine from one place to another, which it is apparent will be the case, as the seed-distributing shaft is driven by the wheel $E^6$ upon the inside of series, and consequently no movement will be imparted to such shaft when the series of gears are not rotated. The same movement of the arm H and its rod which releases the spring G' from its control of lever F, only a little further continued, raises the wheels out of gear, as above described.

Having thus described my invention, what I claim, and desire to secure by Letters Patent, is—

1. The construction of arm H, substantially as and for the purpose set forth.

2. The combination and arrangement of the arm H, guide G, spring G', having its stop-pin, and lever F, substantially as and for the purpose specified.

3. The combination of the lever F, ratchet F', gear-wheels E, $E'$, $E^2$, $E^3$, $E^4$, $E^5$, and $E^6$, arranged to govern the discharge of the seed, as specified.

In testimony whereof I have signed my name to this specification in the presence of two subscribing witnesses.

BENJAMIN KUHNS.

Witnesses:
R. M. NEVIN,
JACOB F. LURTZ.